(12) United States Patent
Jacobson et al.

(10) Patent No.: US 6,434,573 B1
(45) Date of Patent: Aug. 13, 2002

(54) METHOD FOR EFFECTIVE INDEXING OF PARTIALLY DYNAMIC DOCUMENTS

(75) Inventors: Guy Jacobson, Bridgewater; Balachander Krishnamurthy, Chatham; Divesh Srivastava, Summit, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/210,609

(22) Filed: Dec. 15, 1998

Related U.S. Application Data

(63) Continuation of application No. 08/935,516, filed on Sep. 23, 1997, now Pat. No. 5,956,722.

(51) Int. Cl.[7] .............................................. G06F 17/30
(52) U.S. Cl. ...................................................... 707/201
(58) Field of Search ........................................ 707/201

(56) References Cited

U.S. PATENT DOCUMENTS

| | | | |
|---|---|---|---|
| 5,479,654 A | * | 12/1995 | Squibb ....................... 707/201 |
| 5,742,820 A | * | 4/1998 | Perlman et al. ............. 707/201 |
| 5,748,954 A | | 5/1998 | Mauldin |
| 5,787,435 A | | 7/1998 | Burrows |
| 6,219,818 B1 | * | 4/2001 | Freivald et al. ............. 714/799 |

OTHER PUBLICATIONS

Grimes, "Searched and Found on the Internet (DEC's Alta Vista Search Engine)," Digital Age, vol. 15, No. 4, p. 11 (Apr. 1996).

Livingston, "Live From the Desktop (Microsoft's Internet Explorer 4.0 Browser Includes Live Feed Support)," Windows Sources, vol. 5, No. 1, p. 195–196 (Jan. 1997).

Hannon, "Startup's Caching Device Speeds Web Access (CacheFlow's CacheFlow 1000)," PC Week, vol. 15, No. 3, P. 46 (Jan. 19, 1998).

* cited by examiner

Primary Examiner—Diane D. Mizrahi
(74) Attorney, Agent, or Firm—Kenyon & Kenyon

(57) ABSTRACT

A method more efficiently indexes dynamic documents. The method adjusts the frequency with which dynamic documents are retrieved taking into account the extent to which the document varies between its most recent retrievals. Furthermore, the method selects portions of the document to be indexed based on the substance of the differences between recently retrieved copies.

21 Claims, 2 Drawing Sheets

METHOD FOR EFFECTIVE INDEXING OF PARTIALLY DYNAMIC DOCUMENTS

CROSS REFERENCE TO RELATED APPLICATIONS

The present application is continuation of U.S. Pat. No. 08/935,516 filed on Sep. 23, 1997, now U.S. Pat. No. 5,956,722 and entitled A METHOD FOR EFFECTIVE INDEXING OF PARTIALLY DYNAMIC DOCUMENTS.

BACKGROUND OF THE INVENTION

The present invention is directed to a method for more efficiently indexing documents. More particularly, the present invention is directed to a method for efficiently and effectively indexing documents which by their nature are partially dynamic, that is change over time, at least in part.

The use of the Internet as an information resource continues to grow. More and more information sites or servers are connected to the Internet and information seekers conduct more and more searches in this unstructured database.

Within this arrangement a given server may serve a number of different sites. An example of a site which may be accessed by users is www.cnn.com. This site is associated with the Cable News Network. The site contains multiple pages. These pages are typically updated multiple times each day, as and when news events warrant.

It is already known to provide spiders, which on behalf of search engine servers will go out into the network on a periodic basis and retrieve documents, consisting of one or more pages, from one or more servers, and indexers, which index the retrieved documents. A problem arises where a document changes much more rapidly than the spider accesses the document to update the index. For instance, if the spider only accesses a document on a daily basis, but the document itself may change multiple times during the course of a day, then it is almost guaranteed that if the most recently retrieved and indexed version of the document is identified in a search operation it will be an incorrect match since the document itself will have changed since the last time it was indexed. Thus, there is a need to develop a technique to more effectively index these dynamic documents.

In addition, as to dynamic documents, typically indexing occurs with respect to the entirety of a document. In some circumstances only portions of a document may change rapidly while other, still useful portions change little at all. Nonetheless, it can happen that if a document changes more frequently than a certain threshold indexing will not be performed with respect to that document at all. Under those circumstances the indexer loses the benefit of retrieving and holding indexing information with respect to those portions of partially dynamic documents that do not change frequently. It would therefore be beneficial to provide some method for maximizing the information to be gleaned from partially dynamic documents.

SUMMARY OF THE INVENTION

The present invention is directed to a method for effectively indexing partially dynamic documents. In accordance with the method of the present invention an indexer keeps track of the characteristics of a document as it performs its indexing operation. For example, an indexer may retain a first copy of a document obtained during a first indexing operation. Then, after a predetermined time interval, a spider may retrieve a second copy of the document. The two copies of the document can then be compared by the indexer to determine the extent to which the documents differ. If the indexer determines that the differences are sufficiently significant, then the indexer recognizes that this dynamic document should be updated more frequently. As a result the indexer adjusts the predetermined time interval, reducing it, so as to retrieve a third copy of the document at a shorter time interval. This process will continue, that is, the time interval will be reduced so long as the differences between any two copies exceed the significance threshold. Alternatively, if the comparison between the first and the second documents indicates that there are no changes or that the changes are less than some insignificant threshold then the indexer may expand the time interval. By monitoring the amount of changes between copies of the documents and then adjusting the time interval with which these documents are retrieved the present invention more efficiently and effectively indexes partially dynamic documents.

In accordance with another aspect of the present invention, the indexer not only characterizes the significance of the differences between copies of the document in question but also notes the extent to which the document copies are similar to one another. The indexer can then use this similarity information to determine to index those portions of the document which have remained substantially constant over multiple copies while ignoring the dynamic or changing portions of the document in terms of the indexing operation. This indexing improvement permits the indexer to glean information from documents which may change frequently, but whose unchanging portions still provide significant information to potential users.

The present invention also includes combining these two concepts of adapting the time interval for indexing as well as adapting the selection of material to be indexed to further enhance the indexing efficiencies.

The present invention also can take into account the general usefulness of a document to others in making a determination as to how frequently to index the document and how much of the document should be indexed. The present invention thus provides an improvement over the indexing capabilities known in the prior art.

DETAILED DESCRIPTION

In accordance with the method of the present invention an indexer can effectively index documents in a database, especially those documents which are partially dynamic, that is, documents which change, in part, over time.

Figure 1:
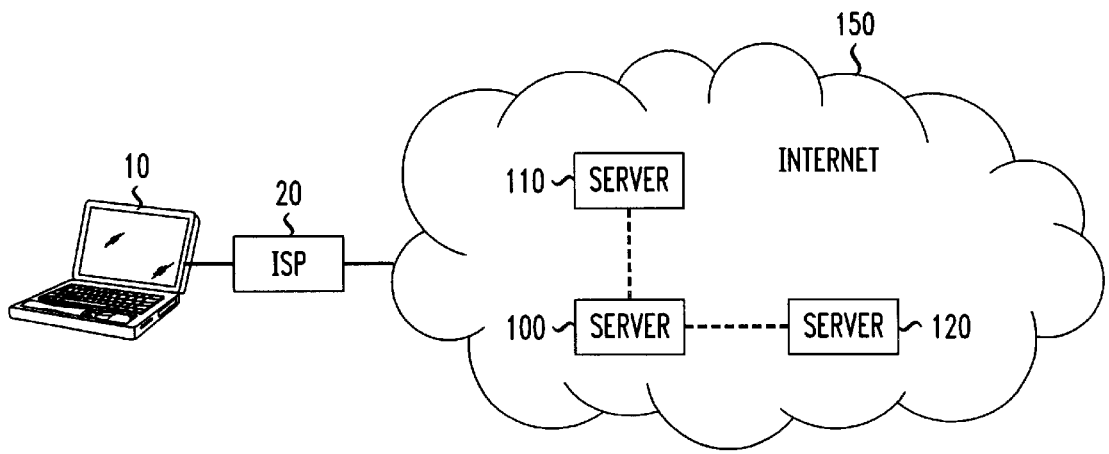
FIG. 1 illustrates in schematic form a network in which the method of the present invention may be implemented.

FIG. 1 shows an environment in which the present invention might be employed. For example, a user may interface with an unstructured database such as the Internet 150 via a personal computer shown as element 10 which is coupled to the Internet through an Internet Service Provider (ISP) 20. Within the unstructured database there may be a number of indexers which keep track of documents contained within the database. One such indexer might be associated with server 100. Other servers in the network, such as 110 and 120, may constitute the sites at which partially dynamic documents reside. First, a spider associated with the indexer, goes out into the network to each of the servers of interest and retrieves desired documents or web pages and brings them back to the indexing server 100. The indexer then indexes documents at that server. Typically this is done in connection with providing search capabilities across the database. When the server 100 indexes the documents that reside on other sites, it retains sufficient information at the indexer to enable key word searching of the database. Thus, server 100, including an indexer, is adapted to index documents on servers within the network.

The present invention provides an improvement in the manner in which the indexer of server 100 operates.

In accordance with the present invention, a method optimizes the frequency with which the indexer causes the spider to retrieve copies of documents across the network to perform indexing. A method also optimizes the extent to which any given dynamic document is indexed. The frequency of indexing can be governed by such factors as the detected rate of change of a document or the apparent significance of a document to users as a whole. The extent to which the content of any one document is indexed can be based on the significance of the portion of the document which remains unchanged over time. These processes enhance the effectiveness of the indexer.

Figure 2:
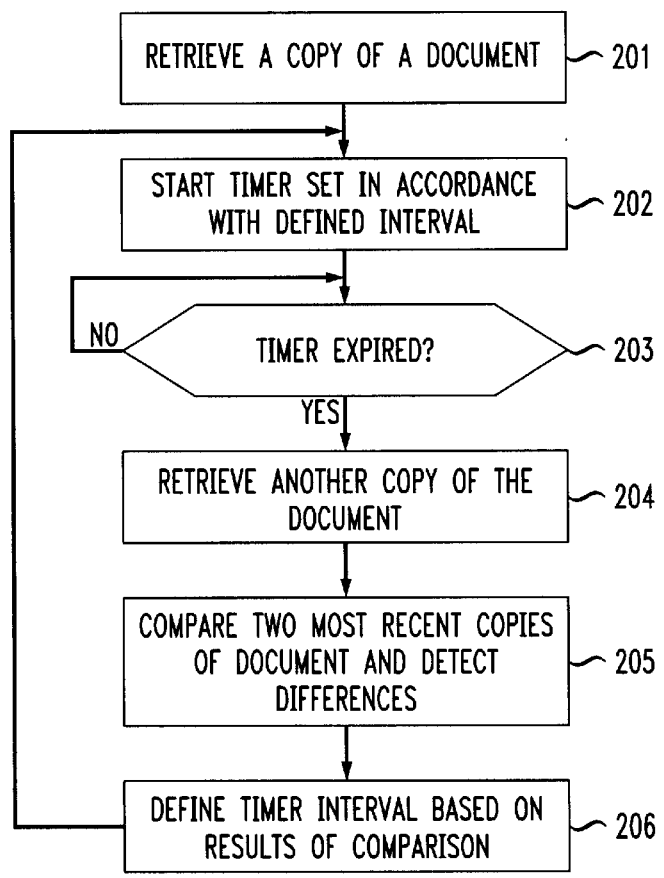
FIG. 2 provides a flow chart describing a process in accordance with a method of the present invention.

In accordance with a first process shown in the flow chart of FIG. 2, the frequency with which the indexer causes the spider to retrieve documents can be optimized. For purposes of this discussion, we will focus our attention on the indexer and its relationship to a single document in the database. It should be recognized by those skilled in the art that this and the following processes are applicable to multiple documents across the database residing at the same server or documents at multiple servers.

As a preliminary matter the indexer prompts the spider to retrieve a copy of a document, step 201. The document can consist of one or more pages. After a first copy of the document is retrieved the system starts a timer that has been set in accordance with a defined interval, step 202. The defined interval is a preliminary estimate or guesstimate of how frequently the retrieved document changes. The system then monitors the timer to determine when the timer has expired, step 203. At the expiration of the timer the indexer prompts another retrieval of the document, step 204. The two most recent copies of the document are then compared to one another in step 205. This comparison operation detects the differences between the two most recent copies of the document. The differences can be detected on a per-page level or alternatively in an aggregate basis over the entire document. The system then can characterize the significance of those differences.

For instance, an indexer may be programmed to categorize the occurrence of any difference between the second copy and the first copy as being significant due to the nature of the document itself. By contrast, certain documents may not be considered so sensitive by the indexer. Therefore, more changes in the document may be tolerated or different types of changes to the document may be tolerated before it is deemed that the document has been changed in a significant manner. Thus, in a first instance, the substantiality of the differences depends on the number of differences between copies of a document. Another basis for determining whether to index could be the type of content that has changed in the document. For instance, a given document might be a page with information about a corporation and the page could remain static except for the stock price. Since there is only one change a decision based purely on the number of changes might not be effective. But, if the decision is made based on a change to specific content then it will attribute significance to this change.

When the indexer determines that the document has been changed in a significant enough manner, or alternatively the indexer determines that the changes in the document are so trivial as to not really constitute a change of the document at all, then the indexer can adjust the timer interval which will define the next time that a copy of the document is retrieved. This will improve the chances that the indexer will retrieve current, meaningful copies of the document. For instance, assume that in step 205 the indexer detects that significant differences exist between the first and second copies of the document. Then, the indexer could define a time interval in step 206 which is less than the initial defined interval. This reduction would be instituted in the hopes of increasing the frequency with which the document is retrieved and hence indexed so as to maintain more up-to-date information with respect to the indexing of the document. As can be seen, the process after the defining of the timing interval in step 206 is repeated so that the timing interval might be further reduced so as to better assure that the document at the indexer is current. Alternatively, if the comparison operation in step 205 indicates that the documents have not changed at all or that the changes are too trivial to note, then the indexer operates to expand the time interval under the premise that to continue to retrieve copies of the document at the already defined interval wastes indexer resources. Thus, the time difference between retrieval of a third copy of the document and the second copy of the document will be longer than the time interval between retrieval of the second copy of the document and the first copy of the document. In this way the indexer hopes to conserve indexer resources, focusing its energies only on those documents which need to be more frequently retrieved and indexed.

In an example of how the timer interval might be modified in step 206, each time the timer interval is reduced it could be reduced by some fixed amount, such as it could be divided in one half. Of course, it may be appropriate to select a lower threshold interval value such that if the document continues to change in significant ways during such an interval the indexer simply decides to stop reducing the interval or stop indexing the page altogether because it is changing too rapidly.

The timer interval alternatively could be doubled if the timer interval is to expected to be expanded.

In another variation on the present invention, the amount of change of the timer interval could be related to the amount of difference between the copies of the document. The greater the amount of change the more the reduction in the timer interval, conversely the less the amount of change the greater the expansion of the time interval.

In a modification to this process the timing interval can also be influenced by the perceived usefulness of a document to user queries. Usefulness can be measured in three ways with increasing levels of confidence.

First, a document's weight is increased if it is an answer to a query. Thus the indexer, if it is associated with a search engine could take note of the fact that the particular document being indexed has been produced as an answer to a query in the path and therefore is deemed to be a more useful document. This piece of information could be used in connection with the amount of change to affect the frequency with which the document is retrieved for indexing.

Second, a document's weight can be increased if a page that points to that document in connection with producing the results of a search based on a query is actually accessed by a user. Again, this highlights the fact that the document has a certain amount of usefulness to users as a whole and therefore should be considered potentially more relevant and possibly more worthy of frequent indexing.

Third, a document's weight may be increased if a user actually follows a link on a page to the document. This indicates that the document is very useful to at least one user and thus there may be enhanced value in indexing this particular document with a certain higher degree of regularity.

Therefore, based on these usefulness approximations and the relative changes of the documents over time the indexer can optimize the time intervals for retrieving copies of a given document for indexing purposes.

As discussed above the present invention also concerns the notion of optimizing the indexing operation with respect to documents that have been retrieved and noted to be different from previous copies of the document. The process flow illustrated in FIG. 3 relates to this notion. The indexer may retrieve a copy of the document, step 301. As in the first process a timer may be started where the timer is set in accordance with the defined interval, step 302. Once the timer has expired as detected in step 303, another copy of the document is retrieved, step 304. In this embodiment the timer is then reset with the defined interval. Of course, the embodiment could be modified to incorporate the modification of the defined interval as described with respect to the process of FIG. 2 and the description associated therewith. Once the second copy of the document has been retrieved the indexer compares recent copies of the document and detects differences, step 305. This could be a comparison of the two most recent copies or it could go back some predetermined number of copies greater than two. The document is then indexed in accordance with the significance of detected differences, step 306. In this last step, the indexer determines those portions of the document to index based on the extent to which the copy of the document differs from earlier versions of the document. For example, the indexer may determine that there is a substantial portion or component of the document which remains unchanged from copy to copy of the document. The indexer may also detect that certain less significant portions of the document change frequently. To conserve indexing resources, rather than frequently retrieve copies of the document to update that small portion of the document which changes frequently, the indexer may opt instead to simply index the portion of the document that remains relatively static or stable. It can retrieve documents with less frequency or at the same frequency as initially set in step 302. The static portions could be indexed just once. Thus, the indexer in this process adapts the retrieval and indexing operation to the extent to which a document varies from copy to copy, possibly selecting to index only those portions of the document which remain relatively stable.

In considering the significance of detected differences the indexer could use different criteria. For instance, the indexer could simply look at the amount of change of the document from one copy to another and judge the significance of change with respect to these amounts. Alternatively, the indexer could identify areas or portions of the document which remain significant despite the fact that they may constitute only small portions of the document. Having determined those portions to be significant, the indexer may opt to index them despite the relative frequent changes to the remainder of the document.

Figure 3:
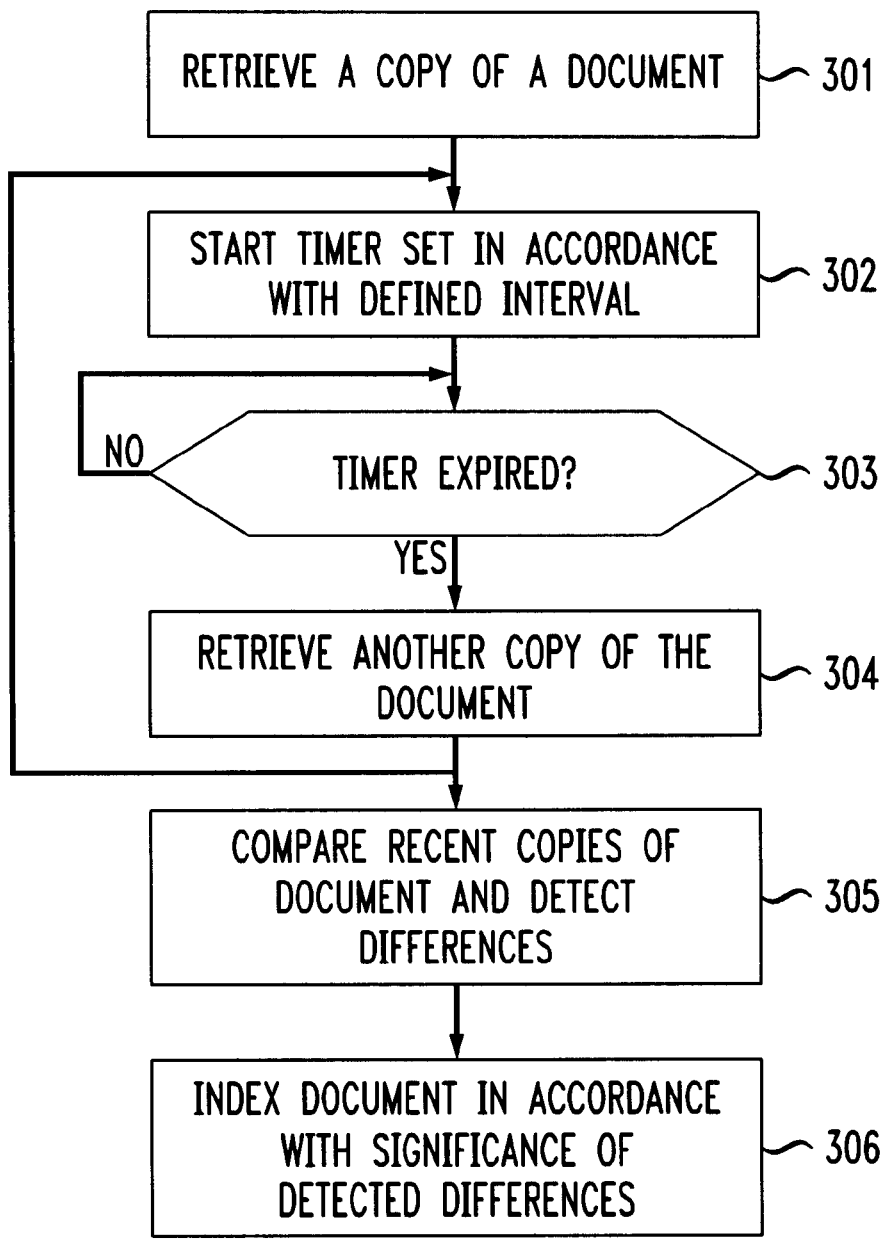
FIG. 3 illustrates a flow chart of another process in accordance with a method of the present invention.

It should be clear to one of ordinary skill in the art that the two processes described separately in FIGS. 2 and 3 can be combined together to further enhance the effectiveness of the indexing of the partially dynamic documents. In particular, the timer interval set for revisiting a document to adjudge the need for indexing can be modified while making a decision as to how much of the document should be indexed as set forth in the process of FIG. 3. The result is a general improvement to the overall operation of indexing these partially dynamic documents.

In yet another variation on the present invention it is possible for the indexer can prompt the spider to focus its attention on specific groups or regions to be examined. In connection with this improvement to the spider, the present invention can incorporate the techniques of region set algebra described in co-pending application entitled "A Method For Using Region-Sets To Focus Searches In Hierarchical Structures" now U.S. Pat. No. 5,970,489 by the same inventors assigned U.S. patent application Ser. No. 08/879,500 and filed May 20, 1997, the entire content of which is hereby incorporated by reference. In this circumstance, the indexer uses the region sets as defined in the co-pending application to define the starting points for retrieving documents and hence indexing rather than explicitly listing all possible starting points. As an example instead of identifying cnn.com the region set "news" which might identify a number of different starting points all related to news information.

The present invention therefore provides the advantage that the indexing operation as optimized taking into account the frequency with which partially dynamic documents change as well as the extent to which the documents change over time.

What is claimed is:

1. A method for more efficiently indexing documents, comprising the steps of:

retrieving a first copy of a document at a first time;

retrieving a second copy of the document at a second time subsequent to said first time;

comparing said first copy and said second copy to determine the extent to which said second copy differs from said first copy; and determining an indexing protocol to be applied to said document based on the determined difference.

2. The method of claim 1 further comprising the step of indexing a portion of the document in accordance with the determined indexing protocol.

3. The method of claim 2 wherein the portion of document indexed is limited to a component of the document common to both the first copy and the second copy.

4. The method of claim 1 further comprising the step of indexing a portion of the document in accordance with the determined indexing protocol.

5. The method of claim 4 wherein the portion of document indexed is limited to a component of the document common to both the first copy and the second copy.

6. A method for determining an indexing protocol for a document, the method comprising the steps of:

retrieving a first copy of the document at a first time;

retrieving a second copy of the document at a second time at a time interval subsequent to said first time;

comparing said first copy of the document to said second copy of the document and identifying in said step of comparing differences between said first copy and said second copy; and determining based on the detected differences, whether to index said second copy of the document.

7. The method of claim 6 wherein when it is determined to index said second copy the method comprises the further step of initiating indexing of only portions of the document that have not changed from the first copy to the second copy.

8. A method for indexing documents, comprising:
retrieving a first copy of a first document having a first sensitivity threshold;
retrieving a second copy of the first document;
comparing the first and second copies of the first document to determine a first indexing protocol to be applied to the first document based on the first sensitivity threshold and the differences between the first document's second and first copies;
retrieving a first copy of a second document having a second sensitivity threshold different from the first sensitivity threshold;
retrieving a second copy of the second document; and
comparing the first and second copies of the second document to determine a second indexing protocol to be applied to the second document based on the second sensitivity threshold and the differences between the second document's second and first copies.

9. The method of claim 8, wherein the first indexing protocol defines how frequently the first document should be retrieved and indexed.

10. The method of claim 8, further comprising indexing a portion of the first document in accordance with the first indexing protocol.

11. The method of claim 10, wherein the portion of the first document that is indexed is limited to a component of the first document that has significant differences between the first copy and the second copy.

12. The method of claim 10, wherein the portion of the first document that is indexed is limited to a component of the first document that does not have significant differences between the first copy and the second copy.

13. A method for indexing a partially dynamic document having a first component that is significantly dynamic and a second component that is not significantly dynamic, comprising:
retrieving a first copy of the partially dynamic document;
retrieving a second copy of the partially dynamic document;
comparing one of the first and second components of the first and second copies to determine the extent to which that component of the second copy differs from the first copy and, as a result, determining an indexing protocol to be applied to the partially dynamic document.

14. The method of claim 13, wherein the indexing protocol defines how frequently the partially dynamic document should be retrieved and indexed.

15. The method of claim 13, further comprising indexing at least a portion of the partially dynamic document in accordance with the indexing protocol.

16. The method of claim 15, wherein the portion of the partially dynamic document that is indexed is the first component.

17. The method of claim 15, wherein the portion of the partially dynamic document that is indexed is the second component.

18. A method for more efficiently indexing documents, comprising:
retrieving a first copy of a document at a first time;
retrieving a second copy of the document at a second time subsequent to the first time;
comparing the first copy and the second copy to determine the extent to which the second copy differs from the first copy; and
determining an indexing protocol to be applied to the document based on the determined difference and a usefulness parameter associated with the document.

19. The method of claim 18, wherein the usefulness parameter reflects the frequency at which the document is produced as an answer to a search engine query.

20. The method of claim 18, wherein the usefulness parameter reflects the frequency with which the document is accessed by a user.

21. The method of claim 18, wherein the usefulness parameter reflects the frequency with which information in the document results in a subsequent document being accessed by a user.

* * * * *